United States Patent Office 3,287,025
Patented Nov. 22, 1966

3,287,025
SUSPENSION WITH CONSTANT TRIM AND FREQUENCY
Giampaolo Garcea and Filippo Surace, Milan, Italy, assignors to Alfa Romeo S.p.A., Milan, Italy, a company of Italy
Filed July 10, 1964, Ser. No. 381,762
Claims priority, application Italy, July 18, 1963, 700,987/63
5 Claims. (Cl. 280—124)

It is known that in automotive vehicles characterized by a considerable percentage variation of static load on the suspensions, the conventional suspensions (based on the elasticity of a spring, which is generally of steel) cannot be as yieldably or soft as would be desirable for improvement of the comfort of driving and of road holding. It is also known that this is due to the fact that of the total vertical stroke of the wheel with respect to the body of the vehicle (this total stroke cannot be greater than a certain value, being limited by the space requirements and by the constraints of said suspension with respect to the body) only a part is utilized for the upward and downward movements due to the irregularities of the ground: from the total stroke in fact is subtracted the portion corresponding to the elastic deformation of the suspension by effect of the aforesaid variations of static load; to prevent that subtractive portion from being excessive the spring will have to be rather rigid. Taking then into account that the comfort and road holding characteristics may be within determined limits held to be inversely proportional to the fundamental frequency of the system constituted by the suspended mass of the vehicle and by the suspension, one finds that in a vehicle with conventional suspensions the aforesaid fundamental characteristics, which are already poor for the reasons stated above, become worse when the vehicle is empty, as compared with the loaded vehicle.

Pneumatic suspensions as used at the present time, particularly for heavy vehicles, solve as is known not only the problem of keeping constant the trim of the vehicle (namely the level of the vehicle with respect to ground) so as to permit a greater softness of the suspension (the whole stroke in fact can be used to absorb the relative movements caused by the irregularities of the ground); but they also solve the problem of keeping fairly constant the fundamental frequency of oscillation of the body. This happens with these pneumatic suspensions owing to the fact that the air compressor with which they are equipped allows variation of the weight of the elastic fluid contained in the suspension so that the volume of said fluid in static conditions is kept constant while the static loads vary that are applied to the vehicle and, therefore, to the suspension. These pneumatic suspensions however are rather complicated, cumbersome and noisy owing to the presence of the aforesaid air-compressor, and consequently their use is confined in practice to the field of (motor) buses.

In the domain of motorcars (automobiles) the oleopneumatic or combined hydraulic and pneumatic type suspension came into some use recently, in which in lieu of the air compressor there is provided a hydraulic pump that varies the amount of hydraulic fluid contained in the suspension in order to make up for the variations of volume of the elastic fluid due to the variations of static load applied to the vehicle: in that way the static trim of the vehicle is kept constant but the fundamental oscillation frequency increases with an increase in the static load in relationship with the fact that, as said above, the weight of the elastic fluid remains constant and, therefore, its volume diminishes.

It is an object of the present invention to provide a suspension system in which the trim of the vehicle as well as its fundamental frequency of oscillation may be maintained substantially constant, while retaining the advantage of simplicity of construction, of small space requirement and of lack of noise when compared with the pneumatic type suspension system utilizing a compressor.

The instant suspension, which in fact is based on the consideration that the variations of oscillation frequency as a function of the load have opposed course according to whether the elastic element is constituted by a constant fluid weight or by a metal spring, is essentially constituted by the combination of the two types of elastic elements arranged in parallel in such a manner that the contrasting effects will compensate each other. It has also been found that the compensation of the above mentioned effects becomes advantageous in practice only if the metallic spring is relieved completely, or almost completely, of the task of supporting the static load. In that way, the metallic spring assumes functions which are purely functions of compensation of the dynamic rigidity, so that while it supports a zero or nearly zero load in a condition of static trim, it provides instead positive or negative elastic loads when, by reason of the irregularity of the ground the suspension becomes elongated or compressed, and departs more or less from the condition of static load. A steel spring that must meet only this requirement may be very light and of simple design.

Theoretical investigation has lead the applicant to the conclusion that, in order to keep modest the frequency variations (for instance not higher than 3%) in the above cited hypothesis of an unloaded steel spring with a vehicle in conditions of trim, the rigidity $C_0$ of said steel spring is given by the formula:

$$C_0 = \frac{2\pi^2 f}{g}\sqrt{Q_M \cdot Q_m}$$

wherein:

$f$ = frequency of oscillation of the vehicle,
$g$ = gravity acceleration,
$Q_M$ = maximum load on the wheel.
$Q_m$ = minimum load on the wheel.

Having therefore established the kind of car and the oscillation frequency to be obtained, there exists only one rigidity characteristic meeting the requirement of constant oscillation frequency. The weight of the spring of course will depend not only on the value of $C_0$ but also on the value of the maximum movement of the wheel with respect to the body.

It is clear that if the spring does not carry any load, it should be installed and operate in both compression and tension; however, in order to simplify the structure of the suspension one can have the spring always operate in compression without ever becoming detached from its supports; hence the load supported in conditions of static trim will not be zero.

In that case, the value of the rigidity C is given by:

$$C = \frac{2\pi^2 f}{g}(\sqrt{Q_m \cdot Q_m} + W)$$

If, therefore, one assigns a unit value to the weight of the spring that does not carry any load, with equal stress the weight of a spring carrying a certain percentage of the minimum load $Q_m$ on the wheel has the value given by the formula:

$$P = \left(1 + \frac{g}{x_M \cdot \pi^2 f}\frac{1}{1+\frac{\sqrt{(Z_M)}}{\varphi}}\right)^2$$

where:

$x_M$ = max jolting of the wheel;
$Z_M = Q_M/Q_m$;
$\varphi = W/Q_m$ with $W$ = load supported by the spring.

It is apparent, moreover, that when the suspension is under minimum static load the volume of the air spring attains a maximum value: hence for reasons of space requirement that volume should be limited. Now taking as a unit volume the one corresponding to the limit case in which the steel spring does not carry any load, at equal average pressure in the air spring, the volume of the air spring with minimum static load on the suspension and with an increasing percentage of the load carried by the steel spring, is given by the formula:

$$V = \frac{(\sqrt{Z_M} - \varphi)^2}{Z_M(1-\varphi)}$$

As already stated, to provide a minimal variation of oscillation frequency with a variation in load, it is necessary that the steel spring should not be subjected to any load; with an increase in the load carried by the spring, therefore, there will be greater variations of frequency with the variation of such load of the car; expressing these variations as a ratio between maximum and minimum frequency, results in:

$$\frac{f_M}{f_m} = \sqrt{\frac{1+Z_M-2\varphi}{2(\sqrt{Z_M}-\varphi)}}$$

wherein $f_M$ = maximum frequency;
$f_m$ = minimum frequency.

In the case of a conventional suspension with steel springs or with air springs with constant load the ratio between maximum and minimum frequency results in:

$$\frac{f_M}{f_m} = \sqrt{Z_M}$$

By way of example for a small car one may use the values:

$Q_M$ = 200 kg.
$Q_m$ = 100 kg.
$f_m$ = 1 Hz.
$x_M$ = 70 mm.
$Z_M = Q_M/Q_m = 2$
$G$ = 9.81 m./sec.$^2$ Then the result is C=0,284 kg./mm.

In the diagram of FIG. 3 there are represented as a function of the percentage of load carried by the steel spring in trim conditions, the variations of weight P of the spring (curve P) and the variations of volume V with minimum load on the air spring (curve V), while in the diagram of FIG. 4 are represented, again as a function of the aforesaid percentage of load, the variations of ratio between maximum and minimum oscillation frequency when the load varies. In the practical case taken as an example, to prevent detachment of the spring from its supports a load $W$ = 25 kg. would be needed in trim conditions and, therefore, $\varphi$ = 0.25; from the diagrams one can see then that the weight of the steel spring is 4.3 times that of the loadless spring, while the volume at minimal load and also the maximal frequency variation have varied by little.

It can be seen in the diagram of FIG. 4 that there is a considerable difference: whilst for the solution in parallel one gets a ratio between max and min frequency always smaller than the value 1.1, in a conventional solution with a steel spring or in an air spring at constant weight this ratio is greater than the value of 1.4, since $$\frac{f_M}{f_m} = \sqrt{2} = 1,414$$

Moreover, one can see that while the volume of the air spring at minimal load would involve the limitation of the percent load carried by the steel spring to the value of 0.8 the weight of the steel spring imposes a narrower limitation: in fact by limiting the percent load to values of $\varphi$ = 0.3 − 0.4, one prevents the weight of the steel spring from being increased uselessly.

Merely by way of example but without limitation, a particular embodiment is illustrated in the accompany drawings, wherein.

Figure 1:
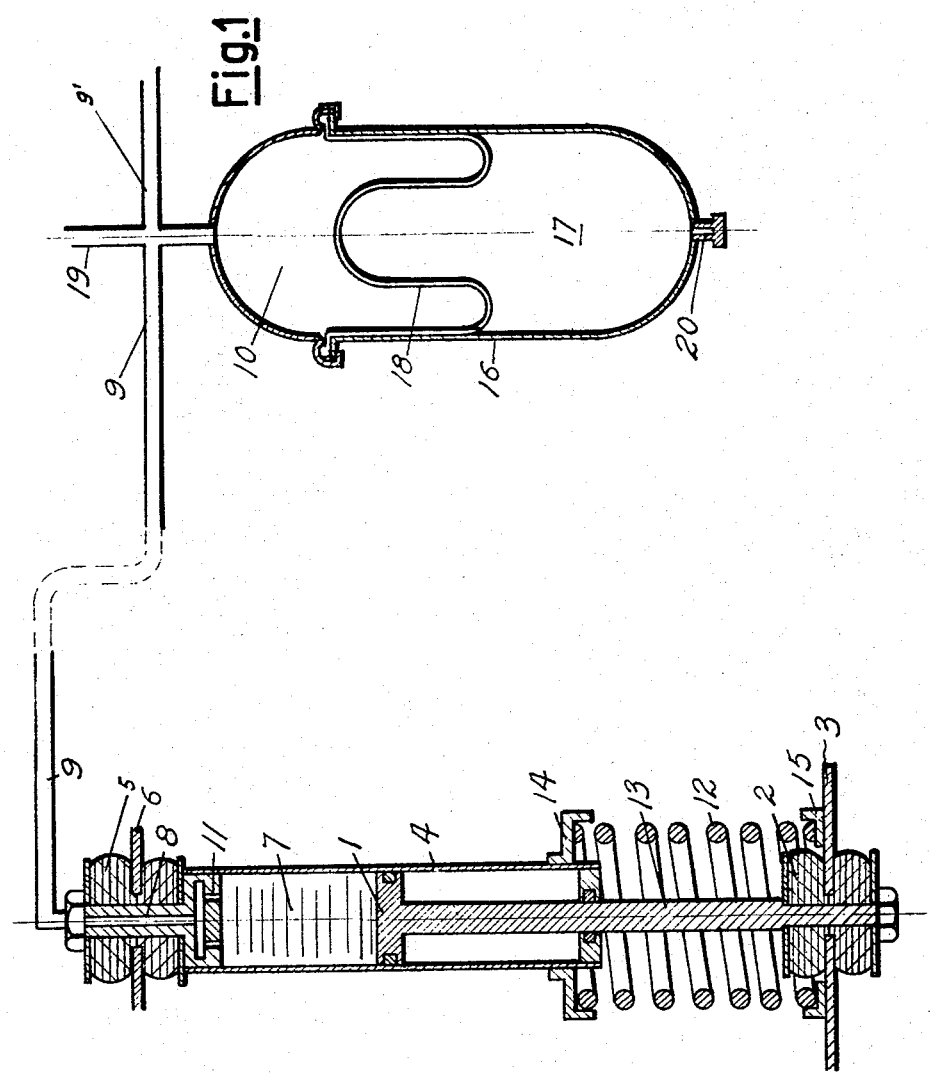
FIG. 1 represents diagrammatically the suspension system of this invention with the hydropneumatic element and metallic spring in parallel in the case in which the latter sustains a small static load.

The piston 1 of the hydraulic cylinder and piston unit the suspension system which sustains the load is connected, through the yielding rubber element 2, to the wheel rigid with the structural element 3, and is immersed into the cylinder 4 connected in turn through the soft rubber element 5 to the chassis or body of the vehicle rigid with the structural element 6. The cavity 7 inside the cylinder 4 is limited by the surface of the piston 1, is filled with hydraulic fluid and in communication, through the passageway 8 and the pipe 9, with the capacity or chamber 10 which too is filled with hydraulic fluid and forms part of expansion tank 16. Between the cavity 7 and the passage 8 there is inserted the shock-absorbing system 11 which is fixed to the cylinder 4. The elastic compensator element 12, constituted by a steel spring, is arranged concentrically around the cylinder 4 and the stem 13 of the hydraulic unit of the suspension system, and has one end fixed at 14 to said cylinder 4 and its other end fixed at 15 to the structural element 3 rigid with the wheel. The expansion tank 16 contains, besides the aforesaid chamber 10 filled with hydraulic fluid a chamber 17 filled with elastic fluid and separated from the chamber 10 by the membrane or diaphragm 18. The chamber 10 is in communication not only, as said above with the cavity 7 through the pipe 9, but also, through the pipe 19, with a device for the adjustment of the trim constituted by the regulator proper and by a hydraulic pump; the conduit 9′ may if needed put the chamber 10 in communication with the hydraulic unit providing the other suspension system on the same front or rear axle of the vehicle.

The valve 20 serves for the initial loading of the elastic fluid into the chamber 17.

In the specific case of the embodiment represented in FIGURE 1 the compensator element constituted by the spring 12 does not contribute to the sustaining of the vehicle in correspondence with the condition of maximum extension of the hydraulic element; owing to its low rigidity the load supported by the said compensator element is very modest of course also in the condition of the vehicle at level (piston 1 at half-way of stroke).

Figure 2:
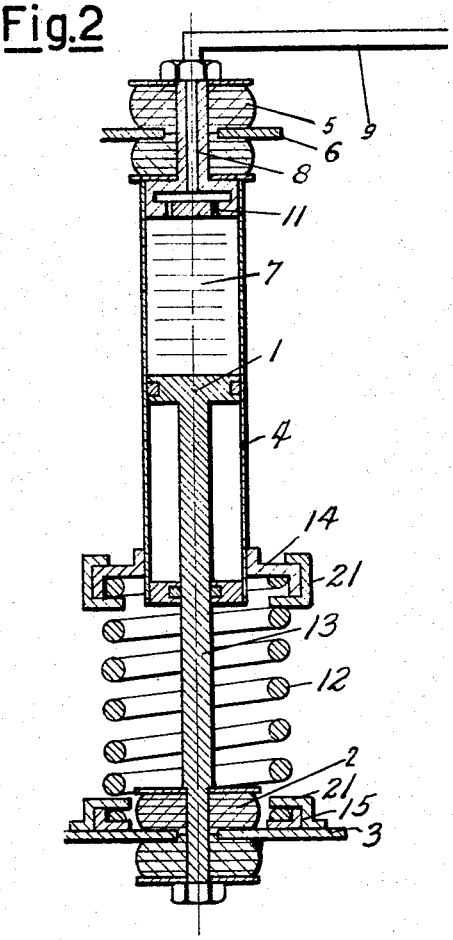
FIG. 2 represents the particular case in which the static load on the metallic spring is zero.
Figure 3:
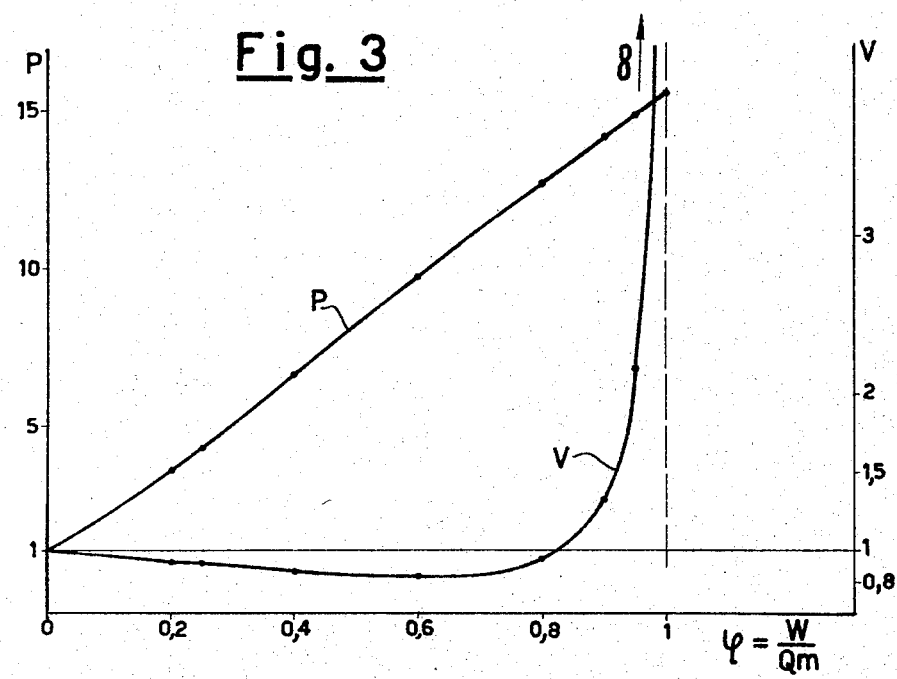
FIGURES 3 and 4 are diagrams showing the variations respectively of the weight and of the volume of the springs and of the ratio between the maximum frequency and the minimum frequency as the result of load variations.
Figure 4:
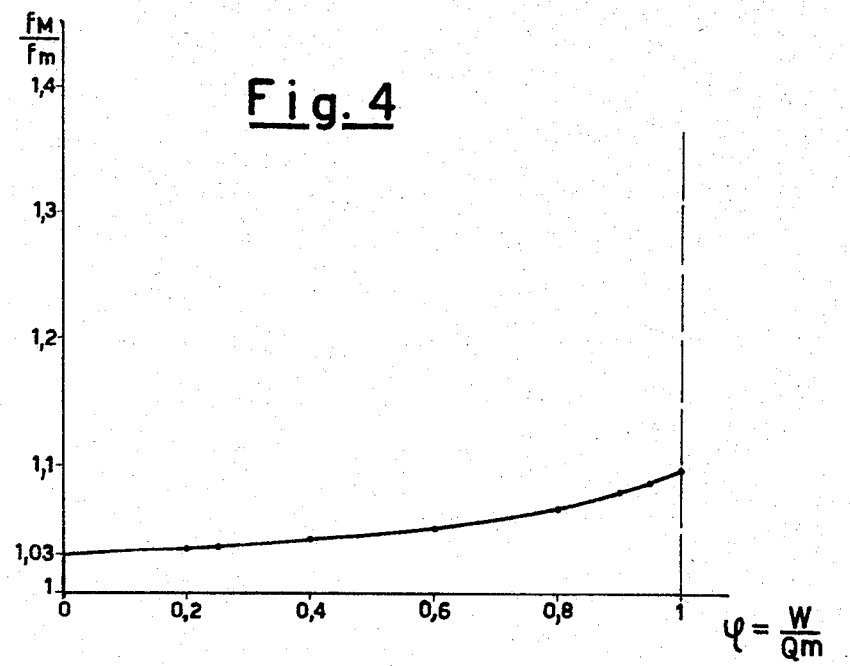

In FIGURE 2 there is represented a second variant of the device according to the present invention, according to which the compensator element is constituted again by the steel spring 12 arranged around the cylinder 4 and the stem 13 of the hydraulic unit of the suspension system, but has its ends fixed to the structural elements 14 and 15 by means of clips 21.

Hence in the condition corresponding to the static trim of regulation (piston 1 about halfway stroke) the load on spring 12 is zero and, therefore, does not contribute to the sustaining of the vehicle. Only in the case of irregularities of ground, when the suspension system becomes elongated or shortened, thereby becoming different from the condition of static trim, the spring provides negative or positive elastic loads by operating in tension or in compression.

What is claimed is:

1. A motor vehicle wheel suspension system comprising a hydraulic cylinder and piston unit, one end of said unit being fixed to the chassis of said vehicle and the other end of said unit being connected to a wheel of the vehicle, said unit being pressurized to support substantially the entire static load of said vehicle on said wheel with said vehicle in proper trim for operation, and a compensator element comprising a solid elastic element, said element being connected in parallel with said unit between said chassis and said wheel, said element in the static load condition of said vehicle being substantially free of load, said element having an oscillation frequency characteristic the variation of which as a function of the load imposed on said element is opposed to the oscillation frequency variation of said unit.

2. A motor vehicle wheel suspension as defined in claim 1 and including an expansion tank, a movable diaphragm dividing said tank into two chambers, a predetermined constant weight of elastic fluid in one of said chambers, a conduit connecting the other of said chambers with said hydraulic cylinder to provide for the transfer of hydraulic fluid in either direction between said cylinder and said other chamber, and a regulating device including a pump for increasing or decreasing the quantity of hydraulic fluid in said other chamber and said cylinder to compensate for variations in the static load of said vehicle.

3. The motor vehicle wheel suspension as defined in claim 1 in which said elastic element comprises a helical steel spring disposed concentrically with respect to said hydraulic cylinder and piston unit, one end of said spring being rigidly fixed to said cylinder and the other end of said spring being rigidly fixed to said piston.

4. A suspension according to claim 1, characterized in that the compensator element is constituted by a helical spring of steel.

5. A motor vehicle wheel suspension as defined in claim 4 in which said steel spring is provided with a rigidity characteristic C defined by the formula $$C = \frac{2\pi^2 f}{g} \cdot Q_m (\sqrt{Z_M} + \varphi)$$

wherein $f$ = predetermined frequency of oscillation of the vehicle;
$g$ = acceleration of gravity;
$Q_M$ = minimal load on the wheel;
$Z_M = Q_M/Q_m$ with $Q_M$ = maximal load on the wheel;
$\varphi = W/Q_m$ with $W$ = load supported by the steel spring in condition of normal operation trim;

the parameter $\varphi$ being limited between the following values $0 \leq \varphi \leq 0.5$

References Cited by the Examiner

UNITED STATES PATENTS

| | | | |
|---|---|---|---|
| 2,953,393 | 9/1960 | Lucien | 280—124 |
| 2,989,301 | 6/1961 | Johannsen | 267—34 |
| 3,032,349 | 5/1962 | Fiala | 280—124 X |
| 3,049,360 | 8/1962 | Allinquant | 280—124 |
| 3,068,022 | 12/1962 | Fiala | 280—124 |

BENJAMIN HERSH, *Primary Examiner.*

W. D. MARCONTELL, M. S. SALES,
*Assistant Examiners.*